Patented July 15, 1952

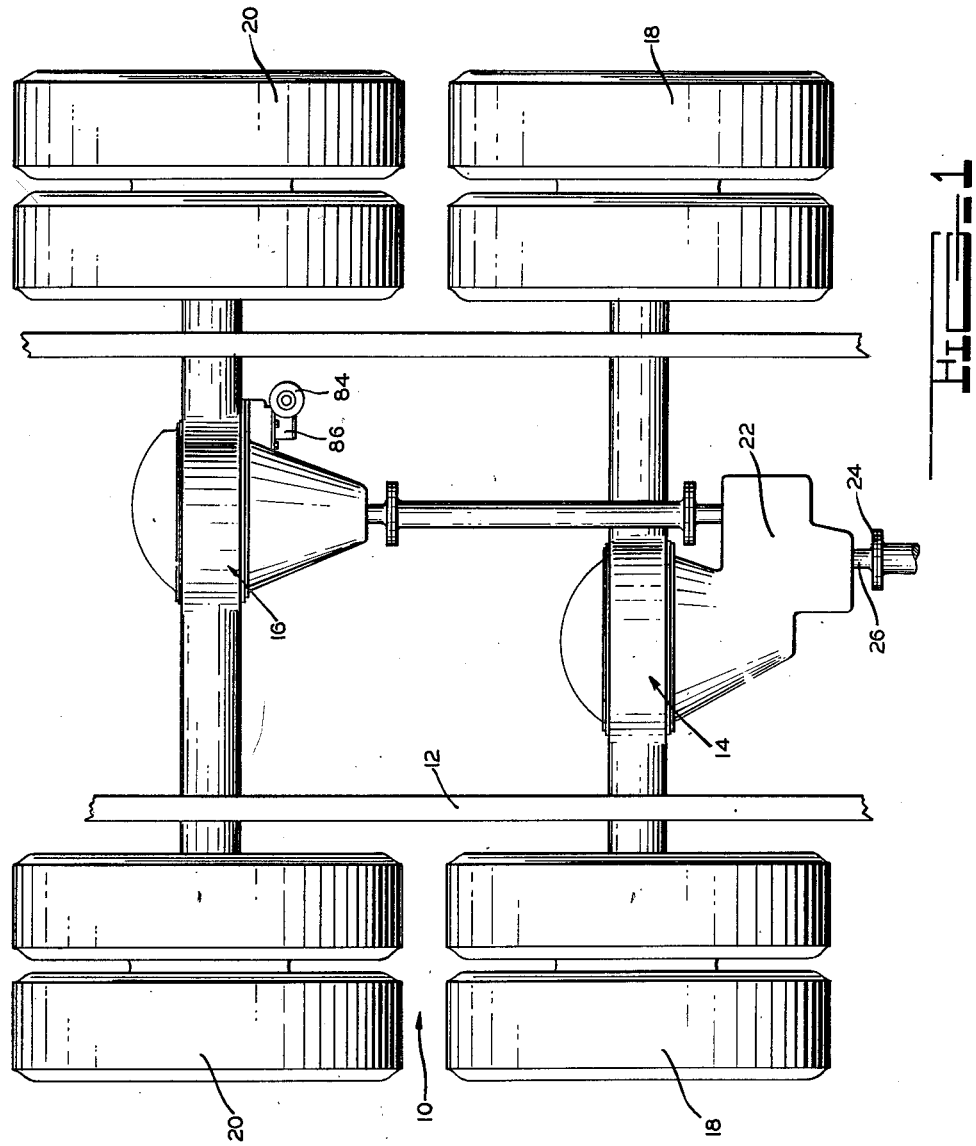

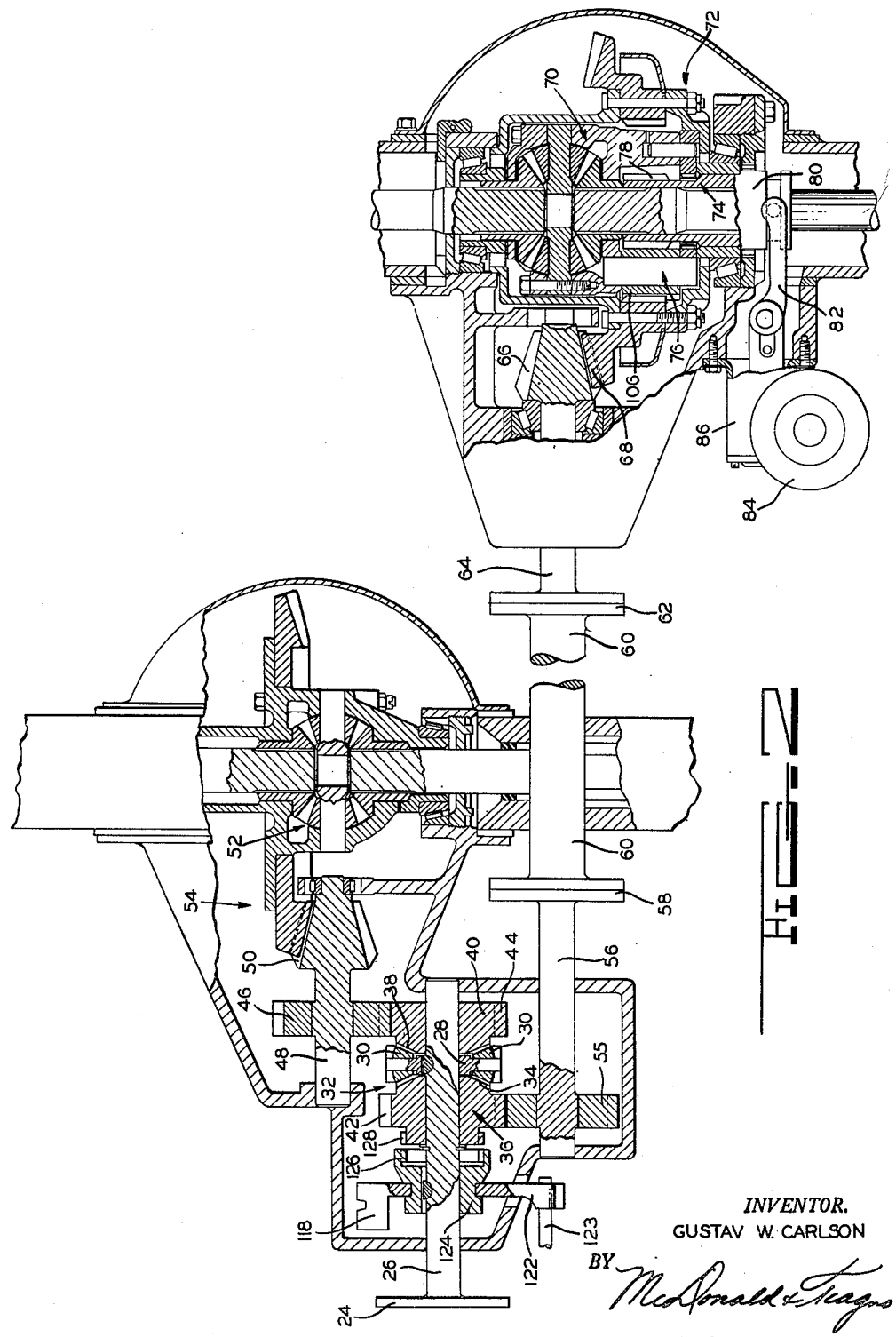

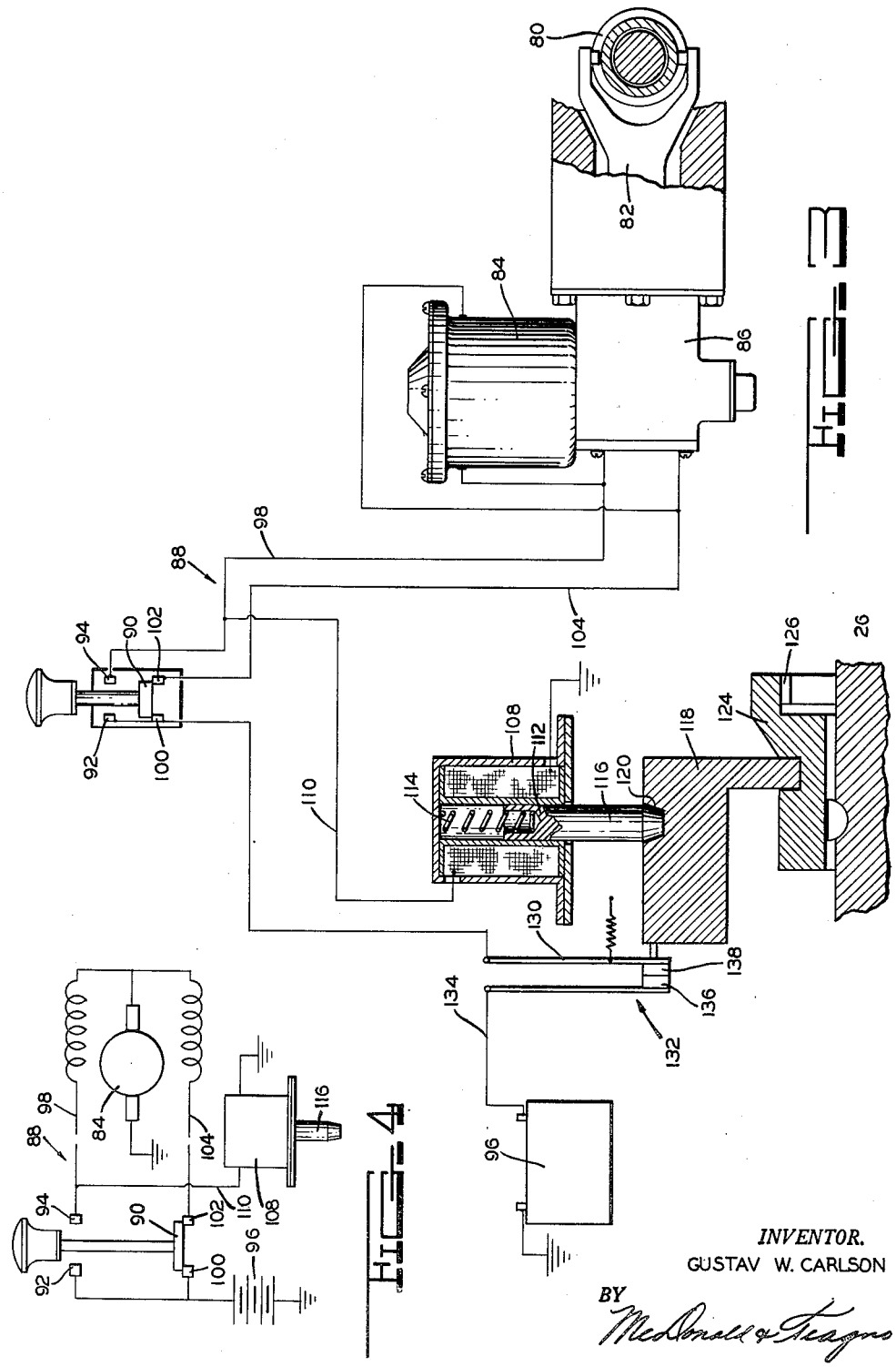

2,603,108

UNITED STATES PATENT OFFICE 2,603,108

MULTIPLE AXLE DRIVE

Gustav W. Carlson, Cleveland Heights, Ohio, assignor to Eaton Manufacturing Company, Cleveland, Ohio, a corporation of Ohio Application June 5, 1950, Serial No. 166,261

7 Claims. (Cl. 74—710)

This invention relates to multiple or tandem axle drive and more particularly to the selective two gear ratio operation of one of the axles.

Broadly the invention comprehends the provision of a tandem axle drive comprising differential gear connected separate single and two gear ratio axles and electrical shift control means for the proper related operation therebetween.

Among the several objects of the invention is the provision of a tandem axle drive comprising a single gear ratio axle and a two gear ratio axle coupled together through the medium of a differential gear set that will permit of the transportation of heavier loads especially wherein the driving torque of the low gear range of the two gear ratio axle can be utilized as required, that is electrical shift controlled to provide for the same or different gear ratio operation of the axles simultaneously, that is provided with means for locking up the differential gearing between the axles when they are to be operated at the same gear ratio, and that is provided with means for preventing the lock up operation of the differential gearing between the axles when the axles are operating at different gear ratios.

Other objects and advantages of the invention will appear from the following description taken in connection with the drawings, forming a part of the specification; and in which:

Fig. 1 is a top plan view of the rear of a vehicle employing a tandem axle drive embodying the present invention;

Fig. 2 is a fragmentary mostly cross-sectionalized view of the differential gearing of the separate axle drives and the interconnecting differential gearing therefore;

Fig. 3 is a schematic illustration of the electrical control system for the tandem axle drive shown by Fig. 2; and Fig. 4 is a schematic illustration of the two field reversible motor and circuit therefore utilized in the apparatus of Fig. 3.

Similar reference characters indicate corresponding parts throughout the several views of the drawings.

The present invention is predicated upon the provision of a tandem axle drive which is adaptable to the transportation by vehicles of heavier loads than might be otherwise possible where it is requisite under certain conditions of vehicle operation that additional driving torque be available to allow the vehicle to negotiate hilly terrain or the like. This requirement is obtainable through the provision of separate drive axles interconnected by a differential gear set and whereby in one axle is operable at one gear ratio and the other axle is operable at two gear ratios, said two gear ratio axle being electrical shift controlled for the desired ratio operation thereof as drive conditions require. Provision is made for locking up the differential gear set interconnected between the axles to permit of direct drive through from the source of power to the respective axles when the axles are operating at the same gear ratio. As a means of insuring that the differential gear set will not be locked up when the separate axles are operating at different gear ratios electrically actuated detent means are controlled from an electrical shift control apparatus for the two gear ratio axle, effective to insure functional operation of the differential gear set when the two gear ratio axle is operating in low. Furthermore, when the differential gear set is locked up the electrical shift control apparatus is inoperative to effect a shift of the two gear ratio axle to a speed ratio different from the other axle. With the differential gear set not locked up, it is possible if desired upon the shifting of the two speed axle to the same gear ratio as the other axle, by the electrical apparatus therefore, to lock up the differential gear set by virtue of simultaneous electrical release of the differential gear set lock up means and the manual shifting thereof to lock out position.

Referring to the drawings for more specific details of the invention 10 represents generally, as shown by Fig. 1, the fragmentary illustration of a vehicle to which the present invention is applied, including a frame 12 extending across and supported on a pair of axle housings 14 and 16. The axle housings 14 and 16 have connected therethrough at the ends thereof dual wheels 18 and 20 respectively. The forward axle housing 14 carries a double casing 22, the purpose of which will hereinafter appear, the front end of which supports a power driving connection 24, adapted to be connected in a conventional manner with a power driven speed change transmission, not shown.

The connection 24 forms one end of a drive shaft 26 to which is splined a spider 28 having beveled idler gears 30, of a differential gear set 32, supported for rotation thereon. The idler gears 30 have meshing engagement in one axial direction along shaft 26 with a beveled gear 34 of a gear member 36 and on their other side, axially disposed along the shaft from beveled gear 34, with a beveled gear 38 of a gear member 40.

The gear members 36 and 40 are provided respectively with like gears 42 and 44, gear 42 meshing with a power input gear 46 connected through shaft 48 and beveled gear 50 with a differential single gear ratio set 52 for the forward axle drive 54 mounted in axle housing 14 whereas gear 44 meshes with a gear 55 splined to a countershaft 56. The countershaft 56 is connected by suitable connector 58 with an extension shaft 60 which, in turn, is connected by suitable connector 62 to a power input shaft 64. Power input shaft 64 supports in splined relation on its free end a beveled gear 66 which has meshing engagement with a beveled gear 68 of a two ratio differential gear set 70 for the rear axle drive 72 mounted in axle housing 16.

Whereas the differential gear set 52 and axle drive 54 are of the conventional type such as is generally disclosed by G. Carlson et al. Pat. No. 2,417,145, the two ratio differential gear set 70 and rear axle drive 72 are of the conventional type disclosed by R. C. Russell Pat. No. 2,462,779.

The two ratio gear set 74 of the axle drive 72 includes a planetary gearing system 76, the sun gear 78 of which is axially shiftable between two positions, one in which the normal speed ratio function of the planetary gear system is operative and the other when the planetary gear system is locked up for straight drive therethrough at the same speed ratio as the axle drive 54 thereby providing for the like ratio of operation of both axle drives to the input gear of the respective differential gear sets 52 and 70.

Sun gear 78 forms part of a quill shaft 80 which is axially movable therewith under the influence of an electrical motor actuated yoke 82 having engagement at one axial end of the quill oppositely axially disposed from the sun gear 78 end thereof.

The operation of the axle speed shifting yoke 82 is effected by a reversible electric motor 84 forming part of an electrical shift mechanism 86 having a manually controllable electrical circuit 88. The electrical shift mechanism and circuit 88 are generally disclosed by aforementioned Pat. No. 2,462,779 utilized in a like manner as disclosed herein for electrically controlling the shift operation of the ratio axle drive, such as forms a part of this invention.

It is to be noted in viewing the schematic electrical shift control of Fig. 3 that the operation of the reversible electric motor is controlled through circuit 88 by a manually operable two place switch 90 such that upon the normal closing of the circuit across contact points 92 and 94 an operation of the motor is effected as supplied electrical current through the circuit from an electrical storage battery 96, by way of branch electrical line 98 of circuit 88. A normal movement of switch 90 to close the circuit across contact points 100 and 102 effects a flow of current from the battery by way of branch electrical line 104 for the reversal of operation of the motor from that effected through branch line 98. The closing of the switch across contacts 92 and 94 corresponds to a shift of the axle drive to high, that is a movement of the yoke to the right as viewed in Fig. 2 to cause a lock-up engagement of the planetary gearing system 76 through the movement of the sun gear 78 into locking mesh with the planet pinions 106 thereof.

The electrical control circuit 88 for the shift control operation of the axle drive 72 has associated therewith a solenoid 108 connected in parallel by way of branch electrical line 110 tied into branch line 98, the armature 112 of which is resiliently loaded in one direction by a spring 114 and carries at its free extremity a detent 116.

The detent 116 forms one part of a locking device utilized in conjunction with an axially shiftable member 118 for controllably restraining the movement thereof under certain conditions by the engagement thereof with a slot 120 formed in the peripheral surface thereof.

The shiftable member 118 is in the form of a yoke having one end 122 thereof connected to a shift operating arm 123 such that when it is not restrained from movement by detent 116 it is effective upon the axial movement thereof through the engagement arrangement of the yoke with a clutch member 124, splined for axial movement on shaft 26, to move the clutch member 124 axially on the shaft. The clutch member 124 is provided at one end internally thereof with clutch teeth 126 adapted to have meshing engagement with clutch teeth 128 formed on gear member 36 for inhibiting, upon engagement therebetween, rotation of the gear member 36 relative to shaft 26. With the locking of gear member 36 to shaft 26 the differential gear set becomes a unitary operating part of the shift and operates entirely in unison therewith, thereby during this phase of operation losing its function as a differential mechanism.

Shiftable member 118 in addition to its association with solenoid actuated detent 116 is engageable in its locked axial position on shaft 26 with a pivotal spring tensioned member 130 forming part of an electrical switch 132 arranged in the branch line 134 of the electrical circuit 88 intermediate the electrical current source and the manual switch 92. Contact points 136 and 138 of switch 132 are normally in electrical contact so long as the shiftable member 118 is in a position wherein the clutch member 124 is out of engagement with the gear member 36, but will be spaced apart out of contact by pivotal movement of switch member 130 when the shiftable member 118 is moved under the influence of shifting arm 123 to lock the clutch member 124 to gear member 36.

With the arrangement of the solenoid 108 connected in the branch electrical line 98, it is obvious that upon the manual shifting of the switch 90 to the position corresponding to high ratio axle gearing for axle drive 72 the solenoid will be energized simultaneously with the operation of motor 84, effective to release the detent from engagement with shiftable member 118 and thus permit the shifting of clutch member 124 into locking engagement with gear member 36 for the lock-up operation of the differential gear set 32.

Once the clutch member 124 is clutched to gear member 36, which is permissible solely when the rear drive axle 72 is operating at the same speed ratio as the front drive axle 54, no shift of the rear axle drive to low is possible inasmuch as a manual shift of switch 90 to low across contacts 100 and 102 is ineffective to supply current to the motor for its reverse operation because at this time the electrical circuit is open through switch 132 and cannot function to supply current therethrough until the differential gear set 32 is released from locked up condition.

Thus with the operational control between the shifting of the rear axle drive 72 and the differential gear set 32 the differential gear set 32 will be operable to divide the driving power between the front and rear axle drives in accordance with the speed ratios of operation but may be locked out of power dividing operation if so desired only when the axle drives are operating in the same gear ratio.

While this invention has been described in connection with certain specific embodiments, the principle involved is susceptible of numerous other applications that will readily occur to persons skilled in the art. The invention is, therefore, limited only as indicated by the scope of the appended claims.

What I claim is:

1. A multiple axle drive comprising the combination of a power input shaft, a differential gear set drivingly connected therewith, a single speed geared axle drivingly connected to the differential gear set, a multiple speed ratio geared axle drivingly connected to the differential gear set, means for locking up the differential gear set for straight drive therethrough, means for shifting the gearing of the multiple speed axle, and means responsive to the axle gearing shifting means for controlling the differential locking up means.

2. A claim according to claim 1 wherein the multiple speed ratio geared axle is a two speed ratio gearing arrangement.

3. A claim according to claim 1 wherein the axle gearing shifting means is electrically controlled.

4. A claim according to claim 3 wherein the means for controlling the differential locking up means includes an electrically operated solenoid connected in an electrical circuit having a part affixed to the armature of the solenoid engageable with the differential gear set locking up means for restraining movement thereof to lock up the differential gear set when the electrical circuit to the solenoid is inoperative.

5. A multiple axle drive comprising the combination of a power input shaft, a differential gear set drivingly connected to said power input shaft, a differential single speed ratio geared axle structure drivingly connected to the differential gear set, a differential two-speed ratio geared axle structure drivingly connected to the differential gear set, a manually controlled electrically operated shift means for the gearing of the two-speed ratio axle, a shiftable lock up device for the differential gear set, means engageable with said shiftable lock up device for controlling the movement thereof, and means incorporated between the electrically operated shift means for the gearing of the two-speed ratio axle and the differential gear set movement controlling means for establishing a fixed relationship of operation therebetween.

6. A multiple axle drive comprising the combination of a power input shaft, a differential gear set drivingly connected to said power input shaft, a differential single speed geared axle structure drivingly connected to the differential gear set, a differential two-speed ratio geared axle structure drivingly connected to the differential gear set, an electrically operated mechanism for shifting the gears of the two speed ratio axle, an electric circuit having a pair of parallel branches for supplying current to the electrically operated shift mechanism from a source of power, a shiftable lock up device for the differential gear set, a two place manual switch in the electric circuit operable alternately with the branches thereof for supplying current to the electrically operated mechanism, a spring tensioned normally open switch in the electric circuit intermediate the source of power and manual switch, and an electrically operated solenoid connected in one branch of the electric circuit for one controlled axle shift position having a part affixed to the armature of the solenoid thereof engageable with the lock up device to restrain the movement thereof when the solenoid is deenergized and to release the lock-up device for permissible movement when the solenoid is deenergized, said lock up device when in disengaged position maintaining the spring tensioned switch closed.

7. A multiple axle drive comprising a power input shaft, a differential single speed geared axle structure, a differential two-speed ratio geared axle structure, the high ratio gear of which is identical with the gear ratio of the single speed axle, a differential gear set drivingly connected intermediate the input shaft of the axle structure and the gearing of the single speed axle and the two speed axle structures, a reversible electric motor operated gear shifting mechanism for the two-speed ratio axle, an electrical current supply system for the two-speed ratio axle, an electrical current supply system for the motor of the gear shifting mechanism including a source of electrical power, a pair of parallel branch circuits one corresponding to the high gear shift position of the axle and the other to the low gear shift position of the axle, and a manually actuated switch to alternately connect the source of power to one or the other of the branch circuits, a shiftable device for locking up the differential gear set for straight through power delivery from the power input shaft to the axle structures, an electrically operated solenoid connected in series in the high gear branch circuit of the electrical system having an armature thereof engageable with the differential gear set locking up device to restrain the movement thereof when the manual switch connects the low gear branch circuit to the source of power, and a spring tensioned electrical switch in circuit intermediate the source of power and manual switch engageable by the locking up device when inoperative to lock out the differential gear set to maintain the switch closed and tensioned to open position when the differential lock up device is shifted to operative position.

GUSTAV W. CARLSON.

REFERENCES CITED

The following references are of record in the file of this patent:

UNITED STATES PATENTS

| Number | Name | Date |
| --- | --- | --- |
| 1,574,047 | Midboe | Feb. 23, 1926 |
| 2,158,320 | Bock | May 16, 1939 |
| 2,290,089 | Bock | July 14, 1942 |
| 2,309,441 | Cook | Jan. 26, 1943 |
| 2,314,833 | Keese | Mar. 23, 1943 |
| 2,329,916 | Lamb et al. | Sept. 21, 1943 |
| 2,352,301 | Welles | June 27, 1944 |